*Reissued Apl. 2ᵈ 1872.*

121,117

UNITED STATES PATENT OFFICE.

DAVID G. CONGER, OF CHICAGO, ILLINOIS.

IMPROVEMENT IN ROOFING-COMPOSITIONS.

Specification forming part of Letters Patent No. 124,117, dated February 27, 1872.

*To all persons to whom these presents shall come:*

Be it known that I, DAVID G. CONGER, of Chicago, in the county of Cook and State of Illinois, have invented a new and useful Improvement in the Manufacture of Roofing Compositions; and that the following description is a full and exact specification of the same.

In manufacturing my composition the following ingredients and in the proportions stated are used, viz.: One (1) barrel of reduced or paving coal-tar, and four (4) quarts of resin, together with Akron or Newark cement, sand, and field-plaster, in the proportion of three parts of the cement to one of the sand and one of the field-plaster. The barrel of paving or reduced coal-tar is first boiled in any suitable vessel for four hours, to remove all of its volatile elements, when to the boiling tar add the four (4) quarts of resin previously melted, and then let the two—coal-tar and resin—boil for an additional thirty minutes. Now add to the boiling tar and resin a compound of the three parts of Akron or Newark cement, one part of sand, and one part of field-plaster, letting it continue to boil for seven hours or more, until the whole becomes of the consistency of thick paste.

The composition is then ready for use and to be manufactured into sheets or slabs by and through the medium of an apparatus for which I have previously applied for Letters Patent of the United States, and, as described in said application, is to be applied to one side of a sheet of felt.

The compound made as above described, by practical experience and use has been found to be most serviceable and durable, being neither affected by the sun or by frost, nor liable to crack or seam.

I am well aware that all of the several ingredients herein specified have been before substantially used in roofing and in paving; and therefore I do not claim them either separately or combined, but wish it to be distinctly understood that the invention consists only in the proportions treated and applied together, the one after another, as described.

Having thus described my invention, I shall state my claim as follows:

A compound for roofing, made of the materials mixed together in the proportions and as and in the manner described.

The above specification of my improvement in manufacture of roofing-compositions signed by me this 3d day of February, A. D. 1872.

D. G. CONGER.

Witnesses:
ALBERT W. BROWN,
JOHN P. McELROY.